United States Patent [19]

Pristerá et al.

[11] Patent Number: 4,873,451
[45] Date of Patent: Oct. 10, 1989

[54] ELECTRICAL SYSTEM FOR A MOTOR VEHICLE

[75] Inventors: Raffaele Pristerá, Cormano; Edoardo Rugora, Milan; Silvio Fioravazzi, Milan; Giorgio Guelfi, Milan; Aldo Bassi, Milan; Alberto Poli, Ossona, all of Italy

[73] Assignee: Alfa Lancia Industriale S.p.A., Arese, Italy

[21] Appl. No.: 136,276

[22] Filed: Dec. 22, 1987

[30] Foreign Application Priority Data

Dec. 31, 1986 [IT] Italy .................. 22903 A/86

[51] Int. Cl.[4] .................. B60L 1/00; H02G 3/00
[52] U.S. Cl. .................. 307/10.1; 340/459
[58] Field of Search .................. 307/10 R, 9, 10.1; 340/79, 80, 52 F, 52 R

[56] References Cited

U.S. PATENT DOCUMENTS

| 3,864,578 | 2/1975 | Lackey | 307/10 R |
| 4,156,151 | 5/1979 | Borroni | 307/10 R |
| 4,538,262 | 8/1985 | Sinniger et al. | 307/10 R X |
| 4,554,461 | 11/1985 | Oho et al. | 307/10 R X |
| 4,584,487 | 4/1986 | Hesse et al. | 307/10 R |
| 4,594,571 | 6/1986 | Neuhaus et al. | 307/10 R X |

Primary Examiner—William M. Shoop, Jr.
Assistant Examiner—Sharon D. Logan
Attorney, Agent, or Firm—Charles E. Brown; Charles A. Brown

[57] ABSTRACT

The object of the present invention is an electrical system for distributing electrical power to the user devices installed on board of a motor vehicle, and, in particular, the wiring of the electrical system located in the area of the dashboard, which is realized as a subsystem of multiplex type, comprising three electronic microprocessor control units connected by a communication bus constituted by a serial interconnection line for the transmission of data.

4 Claims, 3 Drawing Sheets

ELECTRICAL SYSTEM FOR A MOTOR VEHICLE

The present invention is concerned with an electrical system for a motor vehicle.

The dimensions and the complexity of the wiring of the electrical system of the motor vehicles have been progressively increasing, with the introduction of a larger and larger number of electrical user devices, in addition to the basic devices, constituted by the engine ignition, the lighting and signalling, and the windscreen wipers.

For example, diagnostic equipment is being installed more and more diffusely, which verifies the efficiency of the engine, of the braking system, of the lights, and so forth; auxiliary devices are being more and more used, such as power windows, door locks, heated rear windscreen, air conditioners, and so forth; and widely adopted are electronic control systems of the engine ignition and fuel injection, for skidding prevention upon braking, for the suspensions and for the four-wheel drive of the vehicle.

Consequently, increases in weight and the overall dimensions of the electrical wiring have occurred, and the reliability of the electrical system, as a whole, resulted decreased, in particular due to the increase in number of the connectors.

The purpose of the present invention is to provide and electrical system for the area of the dashboard of a motor vehicle, wherein the complexity, the weight and the overall dimensions of the harness are considerably reduced relatively to the traditional values, and the safety and reliability are improved, with advantages as relates to both the maintenance costs, and the manufacturing, assemblage and management costs inside the manufacturing factory.

Another purpose of the invention is to provide an electrical system formed by a flexible subsystem, adaptable to the architecture of the dashboard, possibly suitable for being structurally integrated inside said dashboard, and also capable to make it possible subsequent expansions of the system to be carried out.

According to the present invention, an electrical system for the distribution of electrical power to user devices installed on board of a motor vehicle equipped with a dashboard, comprising electronic microprocessor control units operatively connected with a source of electrical power and interconnected with one another by means of a multiplex communication bus, or a multiplated communication bus, wherein a main, control unit, or master control unit, performing control functions is also operatively connected with signalling means which signal the requests for actuation of the above said user devices, and at least a secondary control unit, or slave control unit, performing actuation functions, is operatively connected with the said user devices, is characterized in that it comprises two secondary control units, or slave control units, which can be located in the area of the dashboard of the motor vehicle, and at least containing the power stages for the actuation of user devices preferably positioned in the right-hand side, and, respectively, in the left-hand side of the motor vehicle.

According to a preferred solution, also the master control unit is situated in the dashboard area, in order to form, with the other two, slave, control units, one single subsystem.

Furthermore, according to another preferred solution, the above said communication bus between the control units is constituted by a serial interconnection line, preferably formed by two leads, and the access of each control unit to the same communication bus is managed by the master control unit, on the basis of a communication protocol, which establishes the access modalities according to the priorities assigned to the same control units, wherein the transmission of the data takes place according to cycles coordinated by the master control unit, wherein each cycle comprises two steps, the first of which consists of the individuation of the control unit(s) which must transmit the data, and of collecting the transmission requests, which are ordered according to a pre-established priority, and the second of which consists of a pre-established time interval dedicated to the transmission of the data and to the verification of the correctness of the transmission, which allows such data to be validated and acquired.

With this solution, the harness in the dashboard area results very simplified, because the usual bundle of electrical power leads is replaced by the subsystem formed by the two control units and by the communication bus connecting them.

Furthermore, a subsystem is provided, which can be easily adapted to the architecture of the dashboard, and which is also capable of making it possible subsequent expansions to take place.

Characteristics and advantages of the present invention will be now illustrated by referring to Figures 1, 2 and 3, wherein a preferred practical embodiment of the same invention is shown for exemplifying, nonlimitative purposes.

Figure 1:
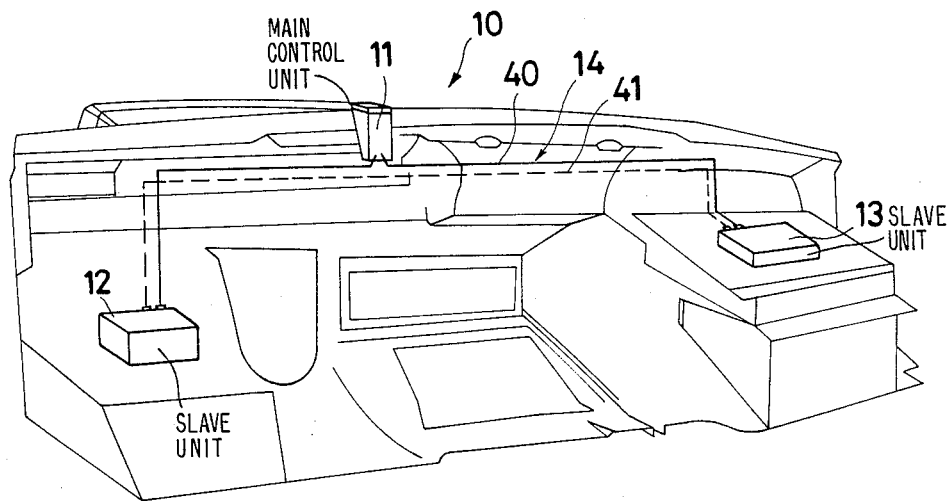
FIG. 1 shows a diagrammatic view of the dashboard of a motor vehicle, provided with the electrical system according to the invention.
Figure 2:
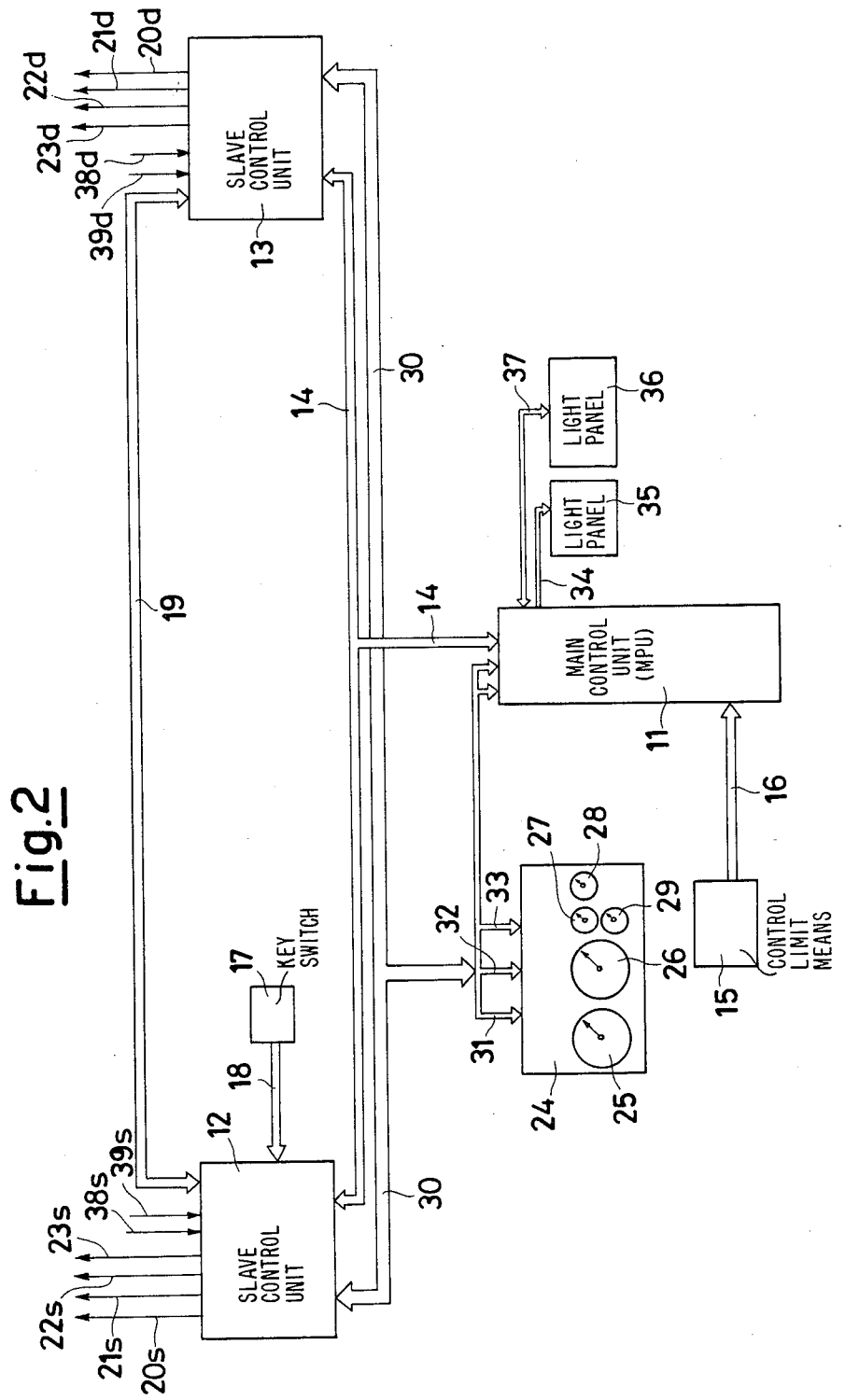
FIG. 2 shows a block diagram of the electrical system of FIG. 1.

In FIG. 1, the dashboard of a motor vehicle is generally indicated by the reference numeral 10, and by the reference numeral 11 the main control unit, or master control unit, is indicated, and by the reference numerals 12 and 13 the secondary control units, or slave control units, viz., the left-hand slave control unit and the right-hand control unit, are respectively indicated. The master control unit 11 is located in the nearby of the control means provided on the dashboard and of the steering column; the slave control units are situated on the sides of the dashboard.

By the reference numeral 14, a communication bus is generally indicated, which comprises two leads, 40 and 41, connecting the three control units with one another.

As anyone can easily see, the three control units form a subsystem, which can be easily installed in the area of the dashboard of the motor vehicle, in as much as it occupies a small room, and eliminates the usual bundle of leads.

The electronic master control unit 11, which is microprocessor-controlled, performs functions of control of the actuation of the electrical user devices, not shown in the Figures, of the motor vehicle.

The user devices can be the internal lights of the motor vehicle, as well as the external lights, such as the parking lights, the low beams, the high beams, the turning sinals and the stop lights, the windscreen wipers, the door locks, the power windows, the pilot lamps, the lamps lighting the on-board instruments, the heated rear windshield, the air conditioner, and so forth.

The control unit 11 receives the input signals, which represent the requests for actuation of the above said devices, coming from the control means located on the dashboard and on the streeing column; these control means are represented by the block 15, and are connected with the control unit 11 by means of the lines 16.

The secondary control units (slave control units) 12 and 13 are microprocessor-controlled, and perform functions of actuation of the user devices, as above listed.

The one of them, 12, contains the power stages and the protection means, not shown, for the user devices located on the left-hand side of the motor vehicle; the other control unit, 13, contains the power stages and the protection means for the user devices located on the right-hand side of the motor vehicle.

The power stages and the protection means of the control unit 12 receive electrical power from the battery, not shown in the Figures, through the block of the key switch 17, and the interconnection line 18, and those of the control unit 13 receive electrical power from the control unit 12, through the interconnection line 19.

With the power stages of the control unit 12, the power leads are connected, which supply electrical power to the user devices actuated by the same control unit; some power leads are represented by the arrows 20s, 21s, 22s, 23s.

Similarly, with the power stages of the control unit 13, the power leads are connected, which supply electrical power to the user devices actuated by the same control unit; some power leads are represented by the arrows 20d, 21d, 22d, 23d.

With the two control units also the input leads, represented by the arrows 38s, 39s and 38d, 39d, are connected, which convey the signals generated by the sensors designed to perform functions of measurement and of monitoring of some devices of the motor vehicle.

By the reference numeral 24, an instrument panel is indicated, which is installed on the dashboard, wherein the speedometer 25, the revolution counter 26, the fuel level gauge 27, the engine coolant liquid temperature gauge 28 and the oil pressure gauge 29 are collected.

The signals of speedometer and revolution counter actuation come from the control unit 12, through the interconnection line 30, and the signals of actuation of the fuel level gauge, of the coolant temperature gauge, and of the oil pressure gauge come from the control unit 13, still through the interconnection line 30; these signals are directly supplied to the instruments of the instrument panel 24 via the interconnection lines 31 and 32.

In any case, also these instruments can be actuated under control by the master control unit 11.

The instrument panel 24 receives input signals from control unit 11 through line 33. Signals received through line 33 serve to actuate lighting lamps of the panel 24 and to actuate fuel level pilot lamp; to actuate coolant temperature pilot lamp; and to actuate the oil pressure pilot lamp when critical conditions exist. The lines 32 and 33 are connected, in their turn, with the control unit 11, which is connected, in its turn, through the line 34, with the panelboard 35 on which other pilot lamps are installed, such as the external lights pilot lamps, and so forth.

The control unit 11 performs also the function of actuation of the warning pilot lamps, indicating the operative status of pre-selected devices, such as the door opening/shutting, the level of the engine lubricant liquid and the level of the engine coolant liquid, the level of the windscreen cleansing liquid, the level of the brake liquid, the wear of the brake pads, and so forth.

These pilot lamps are grouped on the control panelboard 36, which is connected with the control unit 11 through the line 37.

To the central unit 11, the signals relevant to the warning pilot lamps are sent, through the communication bus 24, by the control units 12 and 13, which receive them as inputs form the leads 38s, 39s, 38d, 39d.

Figure 3:
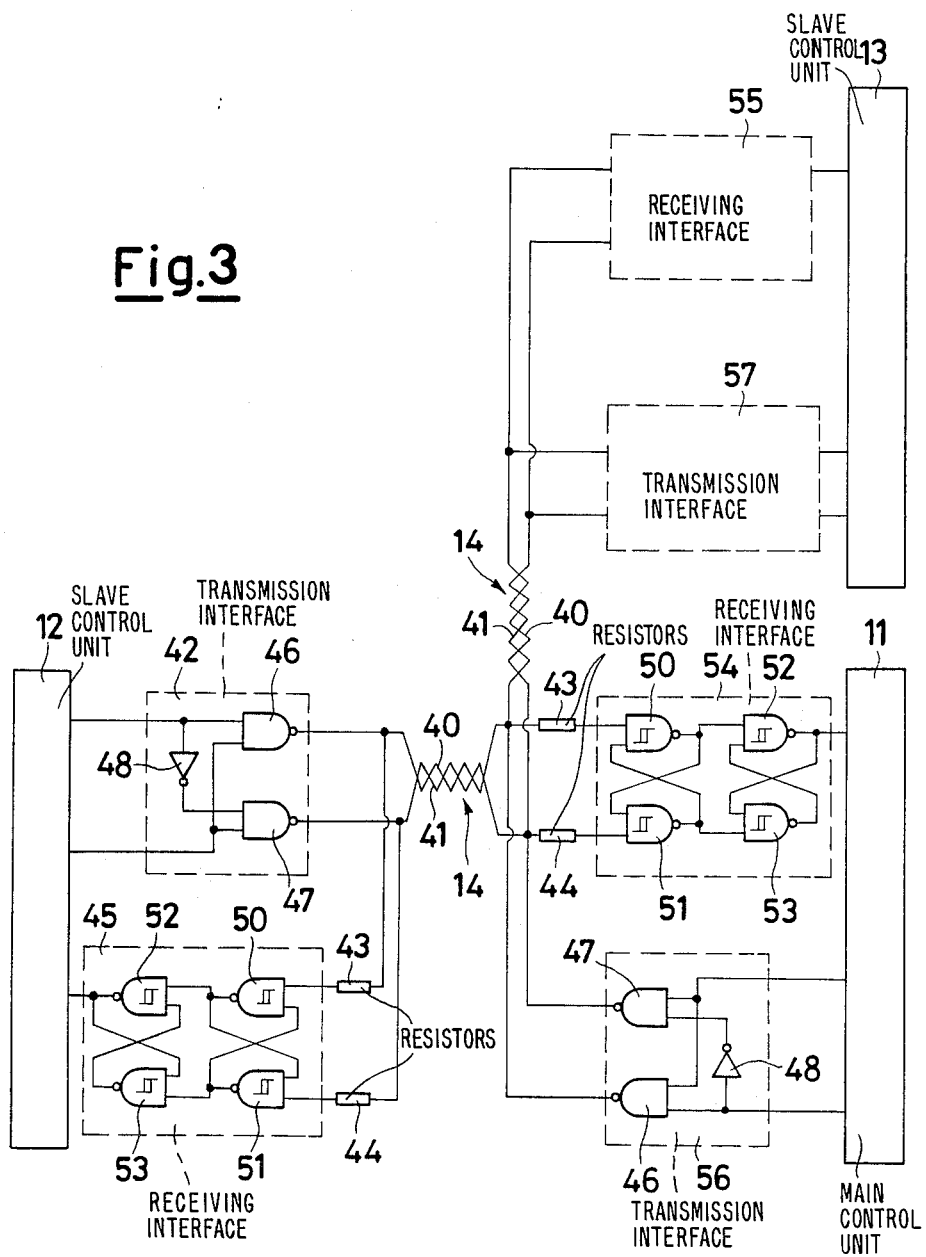
FIG. 3 shows a detail of the electrical system of FIG. 2.

The communication bus 14 which connected the control units 11, 12, 13 is formed by a serial interconnection line, comprising the two leads 40 and 41, which are visible in FIG. 3.

The leads 40 and 41 are twisted to a plait configuration, in order that an identical path and an identical behaviour in case of disturbance is secured.

The leads 40 and 41 are connected with the microprocessor control unit 12 through a transmission interface, generally indicated by 42 and, through the resistances 43 and 44, with a receiving interface, generally indicated by the reference numeral 45. The transmission interface 42 is constituted by the NAND gates 46 and 47 and by the inverter 48; the receiving interface 45 is constituted by the NAND gates 50, 51, 52, 53, which form a bi-stable multivibrator (flip-flop).

The leads 40 and 41 are also connected with the control units 11 and 13 through receiving interfaces 54 and 55 which are identical to interface 45, and transmission interfaces 56 and 57, which are identical to interface 42.

The communication bus 14 can also comprise reserve leads, capable of transmitting between the control units the data relevant to user devices in the motor vehicle which are of basic importance, and hence critical, such as parking lights, emergency lights, windscreen wipers, stop lights.

The access by each control unit to the communication bus 14 is managed by the master control unit 11 with a communication protocol, which establishes the access modalities according to the priorities assigned to the same control units.

The transmission of the data takes place by cycles, coordinated by the control unit 11, which are structurally equal, and are periodically repeated.

Each cycle is constituted by two steps, one step dedicated to the individuation of the control unit(s) which must transmit data, and to the collection of the requests for transmission, which are ordered according to their priority on the basis of a pre-established communication protocol.

During the second step, the true transmission takes place according to the assigned priorities, and the control unit 11 dedicates the pre-established time interval to the reception of a data from another control unit, or to the transmission of a data towards another control unit.

Each transmitted data comprises a certain number of linear sequences (bytes), each composed by a pre-established number of bits.

For example, the binary sequence can be six, wherein the first binary sequence relates to the address of the control unit which must transmit and to the type of data to be transmitted; the following three binary sequences define the true data, the last two binary sequences are check sequences to check the correctness of the transmission, by means of a mathematic operation carried out by dividing the first four binary sequences by a preselected polynomial expression.

The check of the correctness of the transmission is also carried out on each bit of each transmitted binary sequence; this is made possible by the two leads 40 and 41 of the bus 14 and by the transmission and reception interfaces shown in FIG. 3.

The transmission interface (42 or 56 or 57) sends simultaneously, on band base, a binary sequence on the lead 40, and, on the lead 41, a sequence, which is the complement to one (high level) of the first one; the receiving interface (45 or 54 or 55) verifies that the individual bits which are simultaneously present in the two leads are of different level, i.e., the one low, and the other high, or vice-versa, and only in the affirmative the bit present in the lead 40 is acquired by the control unit.

By means of this solution, a circuit is realized, which is extremely function and reliable, besides having a small weight and a low cost.

We claim:

1. An electrical system for the distribution of electrical power to user devices installed on board a motor vehicle equipped with a dashboard, said electrical system assembly comprising a plurality of electronic microprocessor control units, each of said control units being connected with a source of electrical power and being connected with one another by a multiplex communication bus, one of said control units being a main control unit for controlling the operative functions of the user devices, signaling means being connected to said main control unit for sending signals to said main control unit to indicate user's request for actuation of particular user devices, said control units further including first and second secondary control units, said first and second secondary control units being disposed between said main control unit and selected user devices, said first and second secondary units receiving signals from said main control unit and in turn actuate respective user devices and feed signals to said main control unit indicative of operating conditions of the respective user devices, said multiplex communication bus being a serial interconnection line, said secondary units containing power stages for the actuation of said respective user devices, and being connected to a source of electrical power suitable for said power stages, said serial interconnection line being formed by two leads, said two leads of said communication bus being connected to said main unit and said first and second secondary control units through transmission interfaces and reception interfaces wherein the transmission interface sends to one of said leads a first signal to be transmitted and sends to the other of said leads a second signal which complements said first signal, the reception interface being provided to compare the first and second signals with one another and if the difference is within a pre-established value, the first signal passes into the control unit to which it is addressed.

2. An electrical system assembly according to claim 1, wherein said first and second secondary units are positioned on right and left-hand sides of the dashboard area of the motor vehicle, and said main control unit is located within the dashboard area.

3. An electrical system assembly according to claim 1, wherein said main control unit controls the transmission of said signals through said serial interconnection line of a communication protocol basis, setting the access to said serial interconnection line according to assigned procedures, or priorities.

4. An electrical system assembly according to claim 1, wherein said system assembly further includes a control panel board having indicator means for indicating operative status of a number of pre-selected user devices.

* * * * *